Patented July 19, 1932

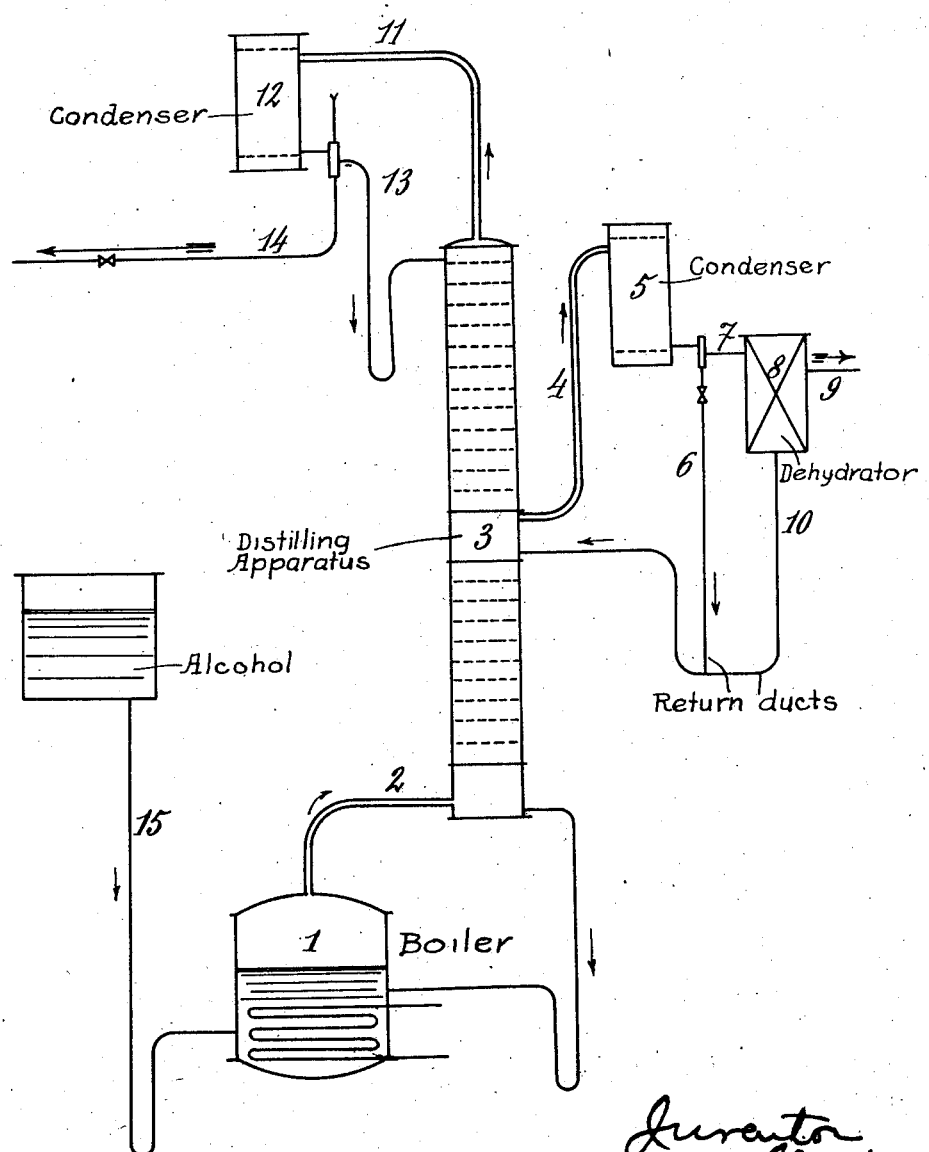

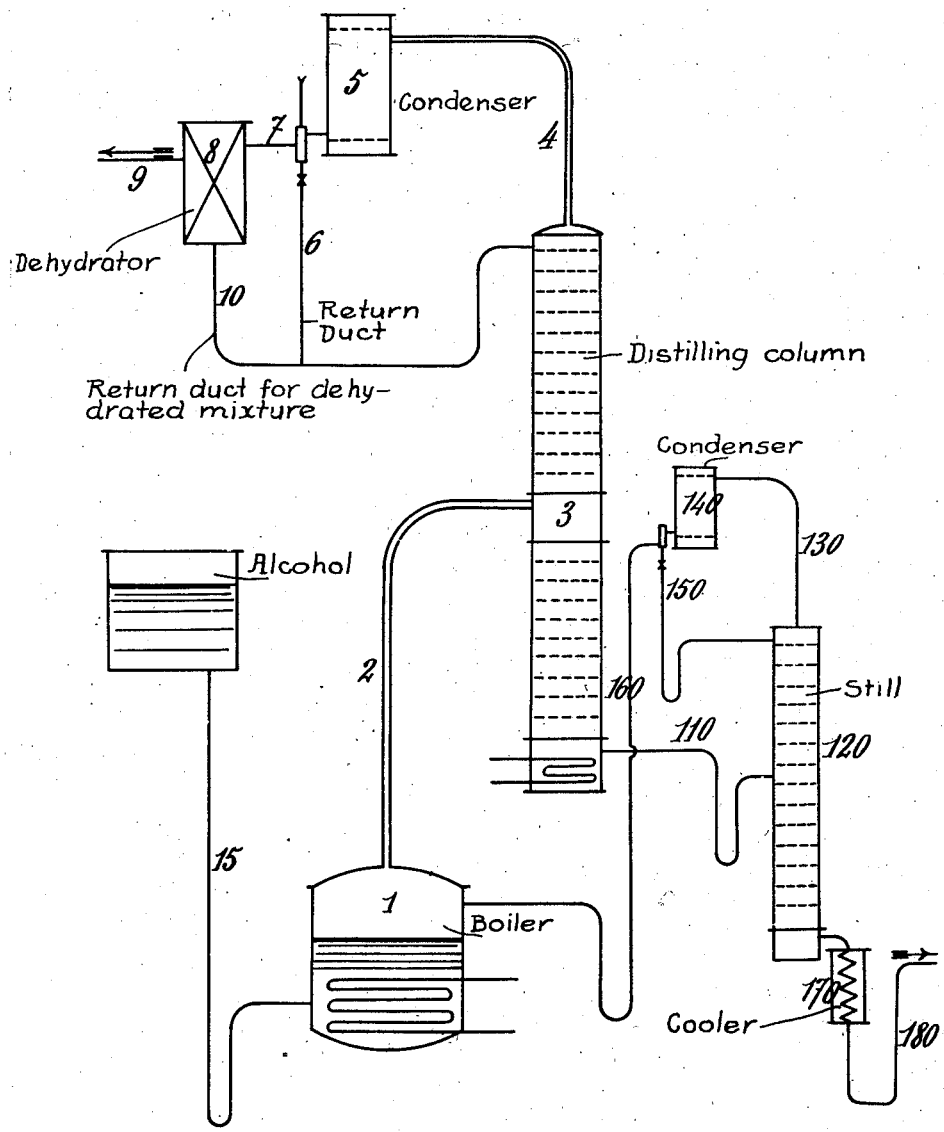

1,868,076

UNITED STATES PATENT OFFICE

ELOI RICARD, OF MELLE, FRANCE, ASSIGNOR TO SOCIÉTÉ ANONYME DES DISTILLERIES DES DEUX-SEVRES, OF MELLE, FRANCE

CONTINUOUS PROCESS FOR THE MANUFACTURE OF ALIPHATIC ETHERS

Application filed November 20, 1925, Serial No. 70,320½, and in Belgium November 26, 1924.

The ethers of the fatty series are manufactured on an industrial scale by the action of sulphuric acid upon the alcohols.

The said manufacture depends upon the following conditions:

(a) The water is set free during the reaction.

(b) The sulphuric acid which is very hygroscopic will retain a portion of the water depending inversely upon the temperature.

(c) The boiling point depends chiefly upon the relative amount of alcohol and sulphuric acid in use, and it is higher according to the amount of acid employed.

(d) The rate of ether formation will diminish according as the sulphuric acid retains a greater amount of water.

From these conditions, I conclude that for the rapid production of ether it is necessary to employ a high temperature, and that to obtain the latter, the mixture must contain a large amount of sulphuric acid.

But it is observed that at high temperatures the alcohol is destroyed by the sulphuric acid with formation of ethylene and in an accessory manner, of sulphurous acid, so that in order to obtain a high efficiency of production the temperature of the reaction must be lowered, and this will lead to the reduction of the sulphuric acid in the mixture, and as above stated to the increase in the amount of water retained in the sulphuric acid and to a decrease in the rate of ether production.

The practical manufacture of said product will thus depend upon contrary actions, and hence cannot be properly performed.

In the manufacture of ethyl ether, for instance, the following conditions prevail; 100 parts of ethyl alcohol are mixed with 150–170 parts of sulphuric acid, and the normal operation is carried out at a boiling point of 130–135° C.

The sulphuric acid retains some 4 molecules of water ($H_2SO_4 + 4H_2O$) or 73 parts of water for 100 parts of acid; its ether-producing power will be reduced, and the decomposition of the alcohol will be low or 2 to 4 per cent.

If the process is so arranged that the acid shall retain for instance only one-half the stated amount of water, the rate of ether production will be ten-fold, but the temperature will rise about 140–145 degrees, and a great quantity of ethylene will be produced.

If the process is so carried out that the temperature will be low and will descend below 125°. C., the alcohol will no longer be decomposed, but the acid will retain more than 4 molecules of water, and the ether will be more slowly produced. So that in the industrial manufacture of ethyl ether, the process is comprised within narrow limits, and approved results cannot be obtained.

With the alcohols having a greater molecular weight, the limiting conditions are still further restricted, so that by the use of sulphuric acid it becomes difficult or even impossible, in the usual conditions, to obtain the ether oxides derived from alcohols containing four atoms of carbon, such as butyl ether, isobutyl ether.

The present invention relates to improvements in the manufacture of simple or mixed aliphatic ethers, by the use of a method and means whereby the water will be eliminated as it is produced, and the water will not be acted upon by the sulphuric acid, so that the acid will maintain practically the initial strength. I employ for this purpose suitable liquids which are insoluble or only slightly soluble in water, termed "withdrawing bodies", which have the property of producing, by distillation, mixtures having a minimum boiling point, rich in water, which can then be readily dehydrated in a known manner. The said insoluble liquids may consist of the products engaged in the reaction, or of liquids added thereto.

The ethers which are formed during the operation are also eliminated in a continuous manner, taking due account of their degree of volatility.

By my present method I am enabled to employ a high and constant rate of ether production, while utilizing small proportions of acid and hence operating at a low boiling point.

I dispense with the accessory production of ethylene or sulphide derivatives, and thus obtain a high efficiency, also eliminating the apparatus termed "saturator" serving to neutralize the acid sulphide products which are formed. My said methods can be well employed when the phosphoric acids or benzene sulphonic acid are employed as acids for ether production.

The following description, with reference to the appended drawings, which are given by way of example, sets forth the said invention.

Figs. 1 and 2 show two constructional forms of plant.

*First example.*—Manufacture of ethyl ether.

I charge the boiler 1 (Fig. 1) with 100 parts of ethyl alcohol, 75 parts sulphuric acid and 5 parts gasoline whose boiling point is 100° C. The apparatus is provided with surface steam heating. The boiling point is in the first place 90°–95° C., but during the operation it rises to 105° C. The resulting vapor is discharged through the conduit 2 into the distilling apparatus 3, this consisting of ethyl ether, water and gasoline. A part of said vapor is withdrawn through the tube 4, and is condensed in the condenser 5. A part of the condensed product is returned into the distilling apparatus 3 through the conduit 6, and another part is circulated into the known dehydration apparatus 8. The water is discharged through the conduit 9, and the dehydrated mixture consisting of gasoline, alcohol and ether is returned through the conduit 10 into the distilling apparatus 3.

The vapor which has not been discharged through the conduit 4 continues to ascend in the apparatus 3; it attains the condenser 12 in which it is condensed; a great part of the same is returned into the apparatus 3 through the conduit 13. Due to this return, the alcohol and the gasoline are brought to the lower part of the apparatus 3, so that in normal operation the vapor condensed at 12 will consist solely of ether vapor, whereof a suitable quantity is discharged through the pipe 14.

The boiler 1 receives a continuous supply of the alcohol to be converted into ether, through the conduit 15.

*Second example.*—In the boiler of the apparatus shown in Fig. 1, I place 100 parts of ethyl alcohol, 100 parts of sulphuric acid and 10 parts of benzene; the operation is performed by surface steam heating; the ebullition commences at 95°–100° C. and rises during the operation to 110° C. The operation takes place in exactly the same manner as in the preceding case, but the ether is more rapidly produced.

In these two examples, the alcohol is by no means decomposed, and the sulphuric acid will serve in a practically indefinite manner without renewal.

I may vary the temperature of the reaction in a very accurate manner by employing a greater or less amount of the withdrawing body. The optimum rate of ether production is obtained at 115°–120° C.

*Third example.*—Manufacture of butyl ether.

In a boiler 1 (Fig. 2) I place 100 parts of butyl alcohol and 50 parts of sulfuric acid at 66° B. No separate withdrawing body is added, since the butyl alcohol and butyl ether will serve this purpose by forming with the water and azeotropic mixture having a minimum boiling point.

Steam heating is employed as before, and ebullition takes place at about 127° C. The vapor is circulated through the conduit 2 into the distilling apparatus 3, it consisting of butyl alcohol, butyl ether and water. It rises through the conduit 4 and condenses in the condenser 5. A part of the condensed product returns through the conduit 6 into the distilling apparatus 3 and the other part is circulated into dehydrating apparatus 8, known per se.

The water is discharged through the conduit 9, and the dehydrated mixture of alcohol and ether is circulated through the pipe 10 into the distilling apparatus 3. The lower part of said apparatus is slightly heated in order that the liquid which descends from one plate to another shall contain solely a mixture of butyl ether and butyl alcohol. The latter flows through the pipe 110 into the distilling apparatus 120, provided with surface steam heating. The vapor ascending through the pipe 130, composed almost exclusively of butyl alcohol, is condensed in the condenser 140; one part is returned through the pipe 150 into the distilling apparatus 120 and the other part passes through the pipe 160 into the boiler 1. Pure butyl ether will descend to the bottom of the apparatus 120, which product is cooled by the cooler 170 and is discharged through the pipe 180.

What I claim is:

1. A process for the continuous manufacture of ethers which consists in adding to the mixture of alcohol and sulphuric acid a withdrawing body which forms with water an azeotropic mixture having a minimum boiling point, in heating the mixture of alcohol and acid whereby the azeotropic mixture will escape and the water formed during the ether producing operation will be eliminated.

2. Process for the continuous manufacture of ethers which consists in adding to the mixture of alcohol and sulphuric acid a withdrawing body which forms with water an azeotropic mixture having a minimum boiling point, whereby the water formed during the ether-producing operation will be eliminated subjecting the mixture to ebullition causing the vapors coming from the ebullition to pass into a column and in removing from the said column a part of the mixture of water, ether, alcohol and withdrawing body, in condensing the said mixture, in dehydrating a part of the condensed product and in returning the remainder to the said column.

3. In a process for the continuous manufacture of ethers of the fatty series by treating a mixture of an alcohol and of an acid, the step which consists in distilling off the azeotropic mixture of minimum boiling point between water and one of the bodies other than the acid which are present in the course of the reaction, continuously removing water from said azeotropic mixture, treating the dehydrated mixture of alcohol and ether that remains so as to continuously remove therefrom the ether which is thus obtained in the pure state, and continuously returning the alcohol from said mixture into the reacting mixture of acid and alcohol, whereby it is possible to remove the water produced in the course of the reaction.

4. Process for the continuous manufacture of ethers of the fatty series which consists in mixing an alcohol and an acid, in adding to them a withdrawing body which forms, with the water resulting from the reaction of etherification, an azeotropic mixture in heating the mixture of alcohol and acid in order to separate the azeotropic mixture whereby the water can be eliminated.

5. In a process for the continuous manufacture of ethers of the fatty series by treating the mixture of an alcohol and of an acid, the step which consists in distilling off the azeotropic mixture of minimum boiling point between water and one of the bodies other than the acid that are present in the course of the reaction, treating said azeotropic mixture so as to continuously remove water therefrom, passing the resulting dehydrated mixture of alcohol and ether through a distilling apparatus so as to continuously remove therefrom the ether, which is obtained in the pure state, and continuously returning the remaining alcohol into the reacting mixture of acid and alcohol, whereby it is possible to remove the water produced in the course of the reaction.

In testimony whereof I have signed this specification.

ELOI RICARD.